United States Patent
Fox et al.

(10) Patent No.: US 6,628,997 B1
(45) Date of Patent: Sep. 30, 2003

(54) METHOD FOR PROGRAMMING A THERMOSTAT

(75) Inventors: Kenneth P. Fox, Avon, CT (US); Richard A. Kolk, Glastonbury, CT (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/562,236

(22) Filed: Apr. 28, 2000

(51) Int. Cl.⁷ .............................................. G05B 19/42
(52) U.S. Cl. ........................ 700/86; 700/89; 700/276; 700/277; 700/278; 165/200; 165/205; 165/209; 165/238; 165/239; 165/267; 236/1 B; 236/46 R; 236/51; 236/94
(58) Field of Search ............................. 700/16, 18–19, 700/28, 86–88, 89, 276, 277, 278; 165/238, 200, 205, 265, 11.1, 11.2, 269, 209, 217, 239, 267, 268; 236/46 R, 51, 94, 1 B

(56) References Cited

U.S. PATENT DOCUMENTS

| | | | | |
|---|---|---|---|---|
| 4,386,649 A | * | 6/1983 | Hines et al. ................ 165/239 |
| 4,606,401 A | * | 8/1986 | Levine et al. ............... 165/11.1 |
| 4,621,336 A | * | 11/1986 | Brown ....................... 236/46 R |
| 4,809,516 A | * | 3/1989 | Jones ........................... 165/236 |
| 4,837,731 A | * | 6/1989 | Levine et al. ............... 165/238 |
| 4,843,084 A | * | 6/1989 | Parker et al. ................ 165/205 |
| 4,884,214 A | * | 11/1989 | Parker et al. ................ 165/205 |
| 5,105,366 A | * | 4/1992 | Beckey ........................ 165/224 |
| 5,203,497 A | * | 4/1993 | Ratz et al. .................. 236/46 R |
| 5,224,649 A | * | 7/1993 | Brown et al. ................ 116/309 |
| 5,329,991 A | * | 7/1994 | Mehta et al. ................ 165/238 |
| 5,395,042 A | * | 3/1995 | Riley et al. .................. 165/237 |
| 5,495,984 A | * | 3/1996 | Santarriaga ................ 165/11.1 |
| 5,505,377 A | * | 4/1996 | Weiss .......................... 165/270 |
| 5,606,698 A | * | 2/1997 | Powell ........................ 717/156 |
| 5,765,636 A | * | 6/1998 | Meyer et al. ................ 165/244 |
| 5,924,486 A | * | 7/1999 | Ehlers et al. ................ 165/238 |
| 6,169,937 B1 | * | 1/2001 | Peterson ..................... 361/733 |
| 6,219,590 B1 | * | 4/2001 | Bernaden et al. ........... 700/277 |
| 6,349,883 B1 | * | 2/2002 | Simmons et al. ........... 165/209 |

\* cited by examiner

Primary Examiner—Ramesh Patel
(74) Attorney, Agent, or Firm—Bachman & Lapointe, P.C.

(57) ABSTRACT

A method for programming a thermostat, comprising the steps of providing a thermostat programmed to convert programming codes into time-temperature schedules; determining a desired time-temperature schedule; developing a programming code corresponding to the desired time-temperature schedule; and entering the programming code into the thermostat, whereby the programming code is translated into the desired time-temperature schedule. The schedule and programming code can advantageously be determined by a user by accessing a server via computer network, on a suitably programmed personal computer, by telephone, or by any other suitable method of allowing the user access to software for determining the schedule and developing the desired code.

25 Claims, 2 Drawing Sheets

METHOD FOR PROGRAMMING A THERMOSTAT

BACKGROUND OF THE INVENTION

The invention relates to a method for programming a thermostat and, more particularly, to a method for programming a thermostat with heating and cooling schedules.

Programmable thermostats are well known in the art and typically have a keypad wherein heating and cooling schedules can be entered so as to provide for different thermostat temperature settings for various periods of the day. Programming the heating and cooling schedules of a programmable thermostat typically requires many button presses, mode changes, good vision and a good memory. Due to size requirements of the thermostat, the display is necessarily small making programming difficult. The difficulty of programming such a thermostat is compounded by the fact that programming directions, which are typically provided with product literature, are frequently not readily available to the user.

It is clear that the need remains for a method for programming a programmable thermostat which overcomes these difficulties.

It is therefore the primary object of the present invention to provide an improved method for programming a programmable thermostat.

It is a further object of the present invention to provide such a method wherein programming is enhanced within the resource constraints of existing programmable thermostats.

Other objects and advantages of the present invention will be presented herein below.

SUMMARY OF THE INVENTION

In accordance with the present invention, the foregoing objects and advantages have been readily attained.

According to the invention, a method is provided for programming a thermostat, which method comprises the steps of providing a thermostat programmed to convert programming codes into time-temperature schedules; determining a desired time-temperature schedule; developing a programming code corresponding to said desired time-temperature schedule; and entering said programming code into said thermostat, whereby said programming code is translated into said desired time-temperature schedule.

The desired schedule and code can advantageously be selected and obtained by a user interfacing with a suitable programming device. The interface could be by computer network, telephone or personal computer, for example. This allows the user to select scheduling options directly from a user friendly graphical user interface.

A further advantage of the invention results from recursively generating a decoding dictionary at the thermostat whereby memory requirements at the thermostat are reduced.

BRIEF DESCRIPTION OF THE DRAWINGS

A detailed description of preferred embodiments of the invention follows, with reference to the attached drawings, wherein.

DETAILED DESCRIPTION

Figure 1:
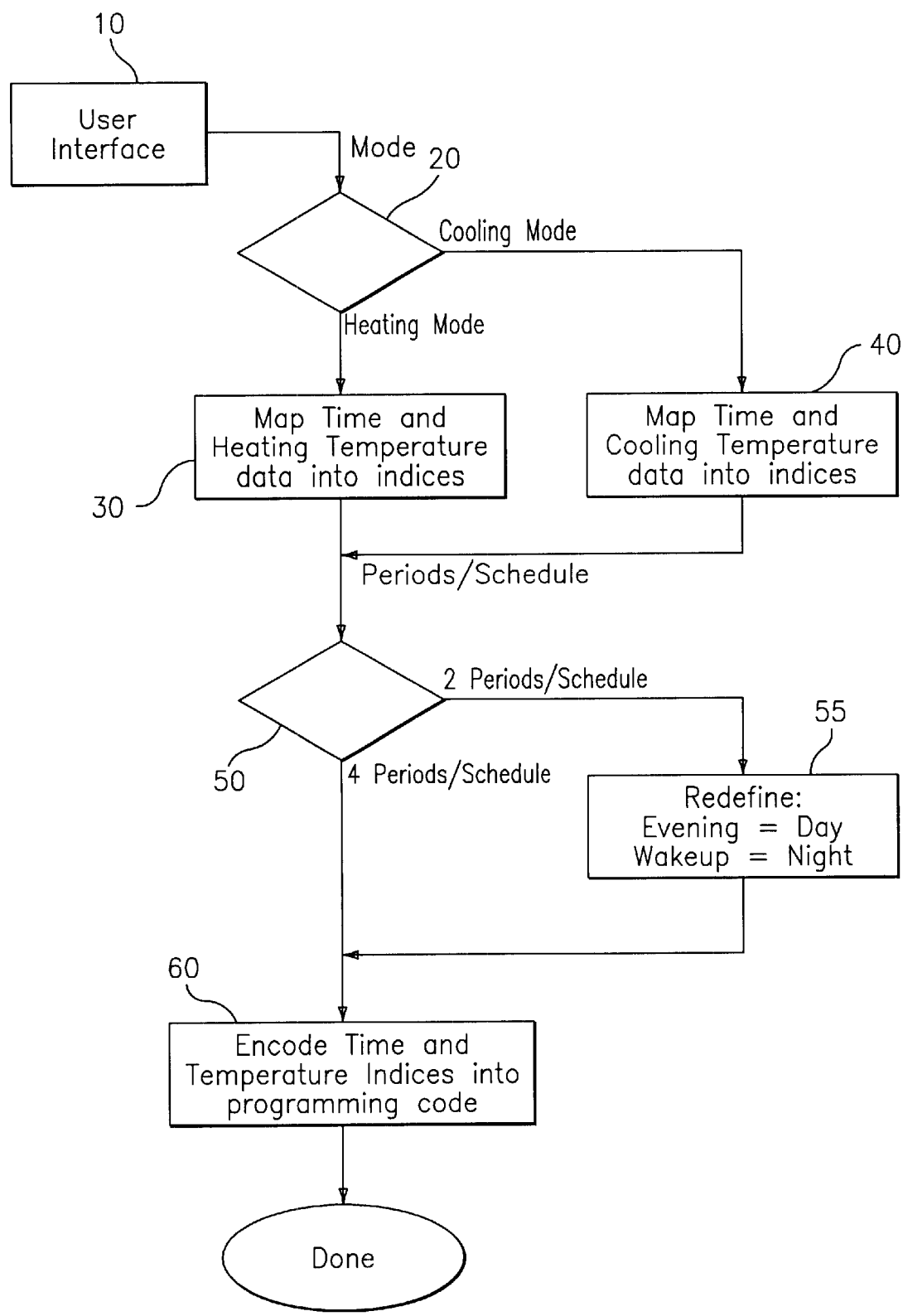
FIG. 1 is a flowchart illustrating the preparation of a programming code in accordance with the present invention.

The invention relates to a method for programming a thermostat and, more particularly, to a method utilizing an external device to create a programming code which can readily and easily be entered into a programmable thermostat, thereby greatly facilitating the programming function.

In accordance with the invention, a method is provided whereby time-temperature scheduling is transformed into a programming code which is recognizable by a programmable thermostat. The programming code is devised using a device external to the programmable thermostat. This allows the programming to be carried out using a far more user friendly device such as a personal computer or a server-based programming device remote to the thermostat and accessible by Internet, telephone network, and the like.

Conventional programmable thermostats typically involve the entering of complex instructions utilizing a very small display window and keypad. This can present difficulty to users when attempting to program the thermostat for operation on 2 or 4 period days, and potentially with more than one different schedule, for example for weekdays and weekends.

It is typically desirable to be able to program a thermostat for at least two periods per day, those being day and night periods. It is further preferable to be able to program a thermostat for operation on a four period day with potentially different instructions for periods during the day such as wake, day, evening and night. Of course, different numbers of periods per day could also be used, if desired.

This programming preferably includes heating setpoints, cooling setpoints and start times for the various periods. Thus, the variables which must be accounted for during programming of a thermostat include heating and/or cooling temperatures for each different period, and various different start times for those periods.

One aspect of the invention relates to the graphical user interface (GUI) or interfaces presented to the user for selecting a desired time-temperature schedule. Another aspect of the invention relates to the programming or development of a code corresponding to the desired schedule and decoding of that code at the thermostat to operate according to the desired schedule.

In connection with the interface, it may be desirable to present a user with a number of time and temperature options from which the desired schedule can be selected, and such options are advantageously displayed to the user as actual options for selection. That is, an interface or display is presented to the user including actual times and temperatures for selection, which greatly simplifies the schedule selection step and makes programming more user friendly.

Table 1 below sets forth a typical example of a limited selection of time-temperature scheduling that could be presented to a user, for example in a GUI of other display.

TABLE 1

| | Periods | | | |
| --- | --- | --- | --- | --- |
| | Wake | Day | Evening | Night |
| Heating Setpoints (deg F.) | 60 | 60 | 60 | 60 |
| | 64 | 64 | 64 | 64 |
| | 66 | 66 | 66 | 66 |
| | 68 | 68 | 68 | 68 |
| | 70 | 70 | 70 | 70 |
| | 72 | 72 | 72 | 72 |
| | 74 | 76 | 74 | 76 |
| | 76 | | 76 | |
| | 80 | | 80 | |

TABLE 1-continued

|  | Periods | | | |
| --- | --- | --- | --- | --- |
|  | Wake | Day | Evening | Night |
| Cooling | 68 | 72 | 68 | 72 |
| Setpoints | 70 | 74 | 70 | 74 |
| (deg F.) | 72 | 76 | 72 | 76 |
|  | 74 | 78 | 74 | 78 |
|  | 76 | 80 | 76 | 80 |
|  | 78 | 82 | 78 | 82 |
|  | 80 | 84 | 80 | 84 |
|  | 82 |  | 82 |  |
|  | 84 |  | 84 |  |
| Start | 5:00 am | Tw + 90 min | 3:00 pm | 9:30 pm |
| Times | 5:30 am |  | 4:00 pm | 10:30 pm |
|  | 6:00 am |  | 5:00 pm | 11:30 pm |
|  | 6:30 am |  |  |  |
|  | 7:00 am |  |  |  |
|  | 7:30 am |  |  |  |

Table 1 would also be valid for allowing selection on a two period per day operation by utilizing, for example, only the day and night entries. Evening temperatures would follow the day temperatures and wake temperatures would follow the night temperatures.

Of course, other types of interfaces could be presented to the user for selection of a schedule. For example, the user could be presented with a number of times starting setpoints for a number of periods selected from half hour increments of a 24 hour period, and a series of possible temperature setpoints, for example ranging from 60° F. to 79° F. in one degree increments.

It should be appreciated that the more options presented to the user, the more complicated will be the encode/decode steps to be performed, which could result in increased memory requirements at the thermostat and/or undesirably long codes.

It should also be appreciated that a user can be presented with several "pre-programmed" options corresponding to certain common time-temperature schedules so as to further simplify the schedule selection process.

According to the invention, the desired schedule is encoded so as to provide a programming code for entry into the thermostat.

The encoding/decoding can be done using a "table-based approach" wherein a dictionary is present at both the code generating device and the code receiving device. The programming code in this approach could be a serially or otherwise generated number corresponding to the desired dictionary entry. This approach results in a reduced length or number of digits of the code, but also in a substantial amount of memory overhead for storage of the dictionary at the thermostat.

The encoding/decoding can also be done using a "raw data approach" which essentially appends time-temperature information directly into the programming code. This results in a reduced memory requirement in the code receiving device, but requires a longer code.

To further illustrate a straight table based approach, assume 4 periods per schedule and 20 possible temperature setpoints per period (for example ranging from 60 to 79 degrees F. in increments of 1 degree). The total number of combinations of temperatures for a heating setpoint profile is $20^4$ or 160,000. It is expected that there would be two schedules for every 7 days, one schedule for workweek and the other schedule for weekend. Thus, the total number of combinations and table entries for a 7 day heating setpoint profile would be $2 \cdot 20^4$, or 320,000, which could lead to substantial memory requirements at the thermostat. Of course, by assigning a different number to each profile, it is readily apparent that any particular profile identifier will not exceed 7 base-10 or base-8 digits.

In connection with the time portion of the schedule, assuming a ½ hour interval for times, there are 48 possible time points in a 24 hour range. This generates $48^4$ or 5,308,416 combinations which must be doubled to account for both weekday and weekend schedules. A time schedule used for heating will be the same schedule as used for cooling, so no additional scheduling is required. Thus, the total number of combinations for time scheduling becomes $2 \cdot 48^4$, or 10,616,832, table entries, which also could lead to substantial memory requirements of the thermostat, but which also could be identified using an 8 digit code. Thus, utilizing a combination of the digit identifiers for temperature and time, the table or dictionary approach will provide substantially complete coverage of the operational time-temperature space with only a 15 digit string to represent the two schedules of four periods for heating and cooling. However, this approach will also require significant memory at the programmable thermostat to hold the table (or dictionary) data.

To further illustrate the raw data approach, the time and temperature information of a schedule is defined through four time-temperature pairs of raw data. In this approach, no table or dictionary is required for interpreting the entered programming code. Rather, a simple program can be provided in the programmable thermostat which will accept the first digit of each pair as a time, for example, and the second digit of each pair as a temperature. Utilizing this approach, a programming code could be provided as follows: [11,68 15,62 27,70 45,64]. Under this approach, the programmable thermostat would be programmed to set 68° F. as a temperature at 5:30 am, 62° F. at 7:30 am, 70 ° F. at 1:30 pm and 64° F. at 10:30pm. This corresponds to 16 base-10 digits for one schedule. Taking into account two different schedules per week, this approach will require a 32 digit string to be entered by a user as opposed to the 15 digit string of the table approach. Of course, the raw data approach does minimize the amount of memory required at the programmable thermostat as compared to the table or dictionary approach.

In accordance with the invention, an encode/decode algorithm has been formulated which utilizes a table-based approach utilizing a subset of the total operational space (for example Table 1), and a recursively generated dictionary. Instructions for generating the dictionary preferably include a first portion contained in the programming code format and a second portion stored in memory at the receiving device. This advantageously provides for a reasonably small programming code as compared to the raw data approach while nevertheless substantially reducing the memory requirements at the code receiving device or thermostat as compared to the table approach.

As set forth above, one encoding/decoding method or algorithm which is particularly useful in accordance with the present invention is a table approach utilizing a subset of the operational space as a user selection menu or GUI, and a recursively generated dictionary, both of which reduce memory requirements at the thermostat. The recursive algorithm does require that a table be ordered such that the most rapidly varying signal, that is, the one with the highest frequency, is in the leftmost column and the slowest varying signal, that is the lowest frequency signal, is in the rightmost column. The recursion is preferably index based rather than value based so as to extend the linearity, thereby making the decode algorithm simpler and more efficient and therefore more suitable to incorporate into a programmable thermostat.

The table is preferably structured in column form with the index in the first column, and successive columns followed by the highest frequency signal through to the lowest frequency in descending order of frequency.

For example, consider a table of 3 signals, x1, x2, x3 defined as:

x1 =[x1(0) x1(1) x1(2)]
x2 =[x2(0) x2(1)]
x3 =[x3(0) x3(1)]

A table (Table 2) can be arbitrarily created with the index in the first column, x1 in the second column, x2 in the third column and x3 in the fourth column as follows:

TABLE 2

| Index | x1 | x2 | x3 |
|---|---|---|---|
| 1 | x1 (0) | x2 (0) | x3 (0) |
| 2 | x1 (1) | x2 (0) | x3 (0) |
| 3 | x1 (2) | x2 (0) | x3 (0) |
| 4 | x1 (0) | x2 (1) | x3 (0) |
| 5 | x1 (1) | x2 (1) | x3 (0) |
| 6 | x1 (2) | x2 (1) | x3 (0) |
| 7 | x1 (0) | x2 (0) | x3 (1) |
| 8 | x1 (1) | x2 (0) | x3 (1) |
| 9 | x1 (2) | x2 (0) | x3 (1) |
| 10 | x1 (0) | x2 (1) | x3 (1) |
| 11 | x1 (1) | x2 (1) | x3 (1) |
| 12 | x1 (2) | x2 (1) | x3 (1) |

The values of x1, x2, and x3 are not used, instead their indices are used. This will preserve linearity in the encode algorithm making the decoding algorithm a linear inversion independent of data spacing and value.

Based on Table 2, the index in column 1 can be represented by the encoding relationship:

$$i = i_{x1} + n_{x1}i_{x2} + n_{x1}n_{x2}i_{x3} + 1$$

where $i_{x1}$=x1 index=[012]
$i_{x2}$=x2 index=[01]
$i_{x3}$=x3 index=[01]
$n_{x1}$=#x1 entries=3
$n_{x2}$=#x2 entries=2

To generalize this relationship, indices $i_{xn}$ can be encoded to provide a programming code (i) for n columns using an encoding algorithm as follows:

$$i = i_{x1} + n_{x1}i_{x2} + n_{x1}n_{x2}i_{x3} + \ldots + n_{x1}n_{x2}\ldots n_{x(n-1)}i_{xn} + 1,$$

wherein i is the programming code, $i_x$ represents index values, and $n_x$ represents the number of selections for each column.

Based on the encoding relationship, repeated below for a three signal table, and using the integer characteristic of the indices, it is possible to solve the encoding relationship directly (non-iteratively) for each index.

$$i = i_{x1} + n_{x1}i_{x2} + n_{x1}n_{x2}i_{x3} 1$$

or $$ii = i - 1 = i_{x1} + n_{x1}i_{x2} + n_{x1}n_{x2}i_{x3}$$

The decode approach used is outlined in the following procedure (Table 3) for the 3 signal table in the above example;

TABLE 3

Step 1: Given the index, i, and each of the signal dimensions, $n_{x1}$, $n_{x2}$, . . . , compute the rightmost signal index, in this case $i_{x3}$ $$i_{x3} = \text{int}\left(\frac{ii}{n_{x1}n_{x2}}\right) - \text{int}\left(\frac{i_{x1}}{n_{x1}n_{x2}}\right) - \text{int}\left(\frac{n_{x1}i_{x2}}{n_{x1}n_{x2}}\right)$$

$$i_{x3} = \text{int}\left(\frac{ii}{n_{x1}n_{x2}}\right)$$

Step 2: Deflate  $ii = i - 1 - n_{x1}n_{x2}i_{x3} = i_{x1} + n_{x1}i_{x2}$

Step 3: Resolve as in Step 1

$$i_{x2} = \text{int}\left(\frac{ii}{n_{x1}}\right) - \text{int}\left(\frac{i_{x1}}{n_{x1}}\right)$$

$$i_{x2} = \text{int}\left(\frac{ii}{n_{x1}}\right)$$

Step 4: Deflate and continue solution iterations until all signal indices are solved.  $ii = ii - n_{x1}i_{x2} = i_{x1}$ Referring now to FIG. 1, the method of the present invention is illustrated starting with selection of a desired heating/cooling and time schedule through to entering of the code in a programmable thermostat.

As shown in step 10, a user interface is established to allow the user to select a desired schedule. The user interface could be a GUI such as Table 1 presenting the user with a limited subset of actual choices within the entire operational space, or could be any other interface selected to allow user friendly entry of the desired schedule. The user interface can be established through accessing processing software which can reside on a server accessed by communication network such as the Internet, or which could reside locally on a personal computer, or both. The user is prompted to enter or select a pre-programmed schedule or the number of periods desired per day, the period starting times and the period temperatures. The programming device receiving this information then determines whether cooling mode or heating mode or both is to be selected, as shown in FIG. 1 at step 20.

As shown in step 30, in heating mode, time and heating temperature data is mapped into indices, as are times and cooling temperature data in step 40. In step 50, the programming device determines whether two or four periods have been selected, and redefines periods (step 55) if necessary. Finally, in step 60, the programming device encodes time and temperature indices into programming code which is then provided to the user for external entry into the programmable thermostat as desired.

Figure 2:
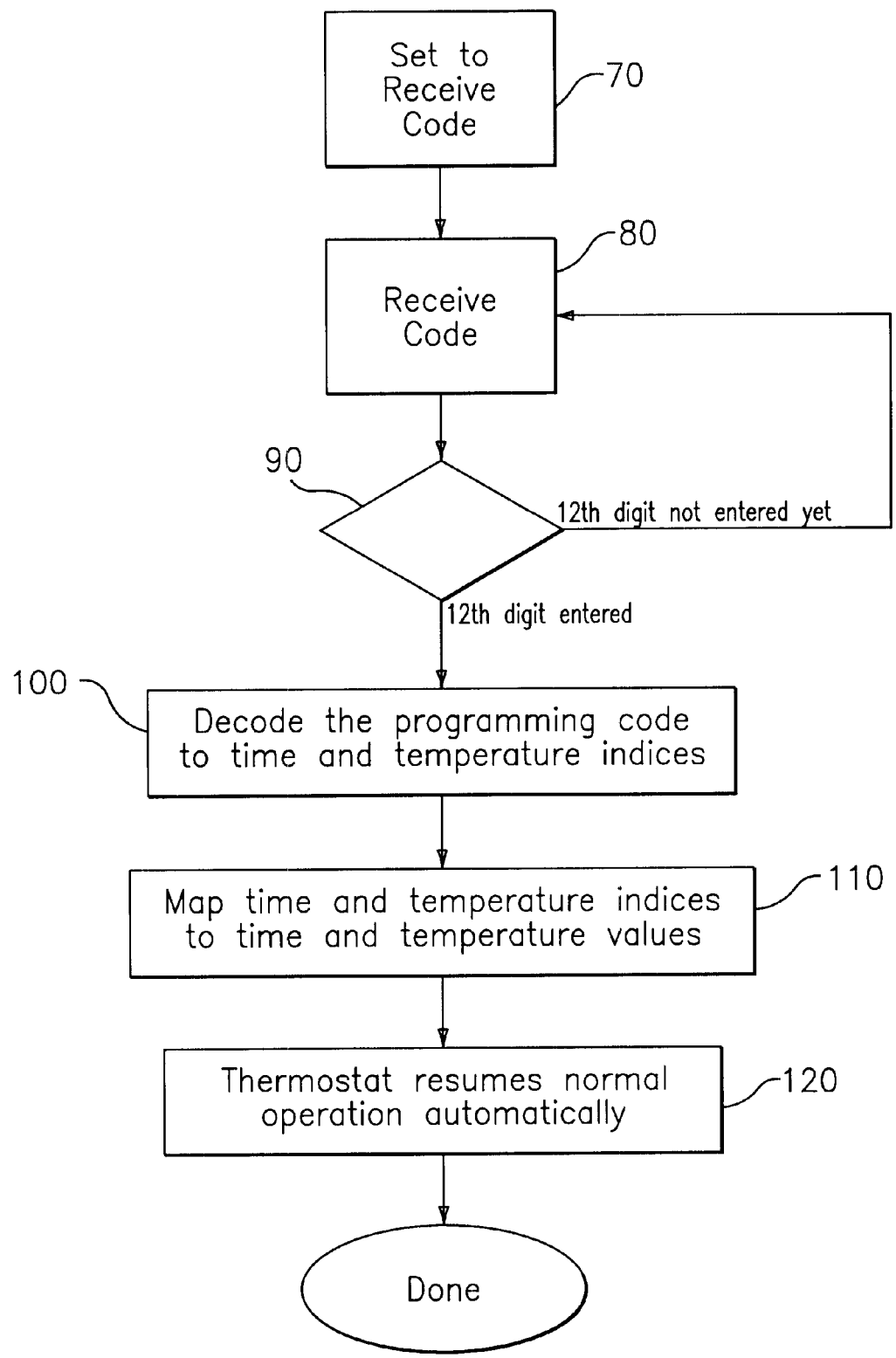
FIG. 2 is a flowchart illustrating the decoding of a programming code at the thermostat device so as to obtain thermostat operating instructions.

Referring to FIG. 2, the method of the present invention related to entry of the programming code into the code receiving thermostat is further illustrated.

As shown by step 70, the thermostat may be programmed to operate in a code receiving mode upon receiving a specified command. Once a user enters this command the thermostat is configured to receive the previously developed programming code.

As shown in step 80, in code receiving mode, the thermostat receives the appropriate programming code, for example, a 12 digit programming code having 6 digits each for two schedules. Since programmable thermostats typically have 8 buttons, the code may desirably have been provided as a code of base 8 numbers. Of course, other types of codes and keypads are suitable within the scope of the present invention, and entry may be facilitated for the user through a keypad overlay and the like.

As shown in step 90, the programmable thermostat will cycle through the code entering step until the full amount of expected digits have been entered, at which point the programmable thermostat will decode the programming code into time and temperature indices (step 100), map time and temperature indices to the time and temperature values (step 110) and resume normal operation automatically under the control of the new programming profile (step 120).

It should be readily appreciated that this method advantageously allows for versatile and detailed programming of the thermostat in a user friendly and resource efficient manner, and thereby responds to the need identified above.

EXAMPLE

In this example, selection is made by the user accessing a web server programmed with appropriate selection and encoding software. In order to illustrate use of the preferred encode and decode algorithms a representative example is presented. Consider a typical 4 period heating setpoint table as shown below:

|  | Periods | | | |
| --- | --- | --- | --- | --- |
|  | Wake | Day | Evening | Night |
| Heating Setpoints (deg F.) | x1 (1) = 64 | x2 (1) = 60 | x3 (1) = 64 | x4 (1) = 60 |
|  | x1 (2) = 68 | x2 (2) = 64 | x3 (2) = 68 | x4 (2) = 64 |
|  | x1 (3) = 70 | x2 (3) = 68 | x3 (3) = 70 | x4 (3) = 68 |
|  | x1 (4) = 72 | x2 (4) = 72 | x3 (4) = 72 | x4 (4) = 72 |
|  | x1 (5) = 74 |  | x3 (5) = 74 |  |

The encode—decode procedure is defined in a three step process.

Step 1: Parameter setup in the thermostat and the web server. Here the heating setpoint values and related dimensionality parameters are defined in both the thermostat and the web server.

1A. Heating Setpoint Values are defined in 4 vectors:

Tw=[64,68,70,72,74]=Wakeup Temperatures

Td=[60,64,68,72]=Day Temperatures

Te=[64,68,70,72,74]=Evening Temperatures

Tn=[60,64,68,72]=Night Temperatures

1B. Dimensionality is the number of elements in each of the four periods:

nw=5=Number of Wakup Temperatures nd=4=Number of Day Temperaturess ne=5=Number of Evening Temperatures nn=4=Number of Night Temperatures Step 2: Encode the temperature selection. This operation occurs in the web server. For illustration purposes, the following four temperatures are defined to represent the wakeup, day, evening, and night selections. T=[72,60,70,64]

2A. Convert the temperature values to their associated indices:

iw=4=Temperature index of wakeup temperature selection id=1=Temperature index of day temperature selection ie=3=Temperature index of evening temperature selection in=2=Temperature index of night temperature selection 2B. Encode the indices into the programming code, i, using the relationship;

$$i = i_w + n_w i_d + i_e + n_w n_d n_e i_n + 1 = 4 + 5 \cdot 1 + 5 \cdot 4 \cdot 3 + 5 \cdot 4 \cdot 5 \cdot 2 + 1 = 270$$

Step 3: Decode the programming code in the thermostat after it has been manually entered. Using the programming code generated in step 2B, the following recursive operations are performed to first extract the individual Temperature indices and then to convert the indices back to actual temperature values.

3A. Decoding operation,

Step 1: Compute the index of the rightmost temperature column. $\quad ii = i - 1 = 269$ $$i_n = \text{int}\left(\frac{ii}{n_w n_d n_e}\right) = \text{int}\left(\frac{269}{100}\right) = 2$$

Step 2: Deflate $\quad ii = ii - n_w n_d n_e i_n = 269 - 100 \cdot 2 = 69 = i_w + n_w i_d + n_w n_d i_e$ Step 3: Resolve as in Step 1 $\quad i_e = \text{int}\left(\frac{ii}{n_w n_d}\right) = \text{int}\left(\frac{69}{20}\right) = 3$ Step 4: Deflate $\quad ii = ii - n_w n_d i_e = 69 - 20 \cdot 3 = 9 = i_w + n_w i_d$ Step 5: Resolve as in Step 1 $\quad i_d = \text{int}\left(\frac{ii}{n_w}\right) = \text{int}\left(\frac{9}{5}\right) = 1$ Step 6: Deflate $\quad ii = ii - n_w i_d = 9 - 5 \cdot 1 = 4 = i_w$ The recursive nature of the decoding operations is in steps 2 through 6.

3B. Convert indices to temperature value

Twakeup=Tw(iw)=Tw(4)=72

Tday=Td(id)=Td(1)=60

Tevening=Te(ie)=Te(3)=70

Tnight=Tn(in)=Tn(2)=64

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for programming a thermostat, comprising the steps of:

providing a thermostat programmed to convert programming codes into time-temperature schedules;

determining a desired time-temperature schedule;

developing a programming code corresponding to said desired schedule, wherein said developing step is carried out externally of said thermostat; and entering said programming code into said thermostat, whereby said programming code is translated into said desired time-temperature schedule.

2. The method of claim 1, wherein said developing step is carried out by accessing a programming server using a communications network.

3. The method of claim 1, wherein said developing step is carried out utilizing a personal computer.

4. The method according to claim 1, wherein said entering step comprises decoding said programming code at said thermostat so as to provide said desired time-temperature schedule at said thermostat.

5. The method according to claim 1, wherein said developing step comprises determining time and temperature data from said desired time-temperature schedule, mapping said time and temperature data into indices, and encoding said indices so as to provide said programming code.

6. The method according to claim 5, wherein said entering step comprises decoding said programming code into said time and temperature indices at said thermostat, and mapping said time and temperature indices to said desired time-temperature schedule.

7. The method according to claim 1, wherein said entering step includes recursively generating a dictionary at said thermostat for decoding said programming code whereby memory requirements at said thermostat can be reduced.

8. The method according to claim 7, wherein said generating step includes executing dictionary generating instructions at said thermostat, said instructions including a first portion contained within said programming code and a second portion stored at said thermostat.

9. The method according to claim 1, wherein said determining step comprises presenting said user with a subset of time-temperature options within a time-temperature operational space, and wherein said developing step comprises recording selections from said subset.

10. The method according to claim 9, wherein said subset is presented to said user in a graphical user interface including actual time-temperature options for selection by said user.

11. The method according to claim 1, wherein said developing step comprises: providing a table of n columns each having a number of entries ($n_{xn}$), selecting values from said table, converting said values into indices ($i_{x1}$-$i_{xn}$) from said table, and encoding said indices using an encoding algorithm as follows:

$$i = i_{x1} + n_{x1}i_{x2} + n_{x1}n_{x2}i_{x3} + \ldots + n_{x1}n_{x2} \ldots n_{x(n-1)}i_{xn} + 1,$$

wherein i is said programming code, and $i_{x1}$, $i_{x2}$, $i_{x3}$, and $i_{xn}$ are said indices.

12. The method according to claim 11, wherein said entering step comprises decoding said programming code by recursively deflating said encoding algorithm so as to obtain said indices, and mapping said indices to said values.

13. A thermostat, comprising:

a storage member; and a decoding program stored in said storage member for receiving a programming code prepared with a predetermined encoding algorithm and for decoding said programming code to obtain a time-temperature schedule corresponding to said programming code.

14. The thermostat according to claim 13, wherein said decoding program is further adapted to receive a command to operate in a programming code receiving mode.

15. The thermostat according to claim 13, wherein said decoding program is adapted to decode said programming code into time and temperature indices and to map said indices to said desired time-temperature schedule.

16. The thermostat according to claim 13, wherein said decoding program is adapted to recursively generate a dictionary for decoding said programming code.

17. The thermostat according to claim 16, further comprising dictionary generating instructions having a first portion stored in said storage member and a second portion contained in said programming code.

18. A method for preparing a programming code for a programmable thermostat, comprising the steps of:

determining a desired time-temperature schedule, wherein said determining step is carried out by a computer external to said programmable thermostat; and generating a programming code corresponding to said desired time-temperature schedule, said programming code being enterable into a thermostat for causing operation at said desired time-temperature schedule.

19. The method according to claim 18, wherein said determining step comprises generating a user interface for allowing entry of said desired time-temperature schedule by a user.

20. The method according to claim 19, wherein said user interface comprises a plurality of options for selection by said user.

21. The method according to claim 20, wherein said options comprise a subset of time-temperature options within a time-temperature operational space, and wherein said generating step comprises recording selections from said subset.

22. The method according to claim 18, wherein said computer is a programming server on a communications network.

23. The method according to claim 18, wherein said generating step comprises determining time and temperature data from said desired time-temperature schedule, mapping said time and temperature data into indices and encoding said indices so as to provide said programming code.

24. The method according to claim 18, wherein said generating step comprises providing a table of n columns each having a number of selectable entries ($n_{xn}$), converting selected entries into indices ($i_{x1}$-$i_{xn}$) from said table, and encoding said indices using an encoding algorithm as follows:

$$i = i_{x1} + n_{x1}i_{x2} + n_{x1}n_{x2}i_{x3} + \ldots + n_{x1}n_{x2} \ldots n_{x(n-1)}i_{xn} + 1,$$

wherein i is said programming code, and $i_{x1}$, $i_{x2}$, $i_{x3}$, and $i_{xn}$ are said indices.

25. The method according to claim 24, further comprising the steps of arranging said selectable entries in a vector for each of said n columns, and wherein said converting step comprises assigning vector positions of said selected entries as said indices.

* * * * *